United States Patent
Ho et al.

(10) Patent No.: US 10,085,006 B2
(45) Date of Patent: Sep. 25, 2018

(54) THREE HUNDRED SIXTY DEGREE VIDEO STITCHING

(71) Applicant: Samsung Electronics Co., Ltd, Suwon-si (KR)

(72) Inventors: Tuan Ho, Garland, TX (US); Madhukar Budagavi, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 15/585,042

(22) Filed: May 2, 2017

(65) Prior Publication Data

US 2018/0070070 A1    Mar. 8, 2018

Related U.S. Application Data

(60) Provisional application No. 62/384,981, filed on Sep. 8, 2016, provisional application No. 62/411,806, filed on Oct. 24, 2016.

(51) Int. Cl.
*H04N 1/04* (2006.01)
*H04N 13/111* (2018.01)
(Continued)

(52) U.S. Cl.
CPC ........... *H04N 13/111* (2018.05); *G06T 7/85* (2017.01); *G11B 27/031* (2013.01); *G11B 27/28* (2013.01);
(Continued)

(58) Field of Classification Search
CPC ....... G06T 13/20; G06T 19/00; G06T 7/0012; G06T 15/04; G06T 2207/10024; G06T 5/002; G06T 2207/20192; G06T 2207/30004; G06T 2207/30201; G06T 7/85; G06T 7/97; H04N 13/0203; H04N 9/646; H04N 2201/0081; H04N 21/4223; H04N 13/0011; H04N 13/0055; H04N 13/0239; H04N 13/0271; H04N 13/111; H04N 13/189; H04N 13/239;
(Continued)

(56) References Cited

U.S. PATENT DOCUMENTS 7,298,392 B2    11/2007    Cutler
7,400,782 B2 *    7/2008    Zhou ..................... G06K 9/209
345/649

(Continued)

OTHER PUBLICATIONS

R. Hartley, A. Zisserman, Multiple View Geometry in Computer Vision, 2nd Edition, Cambridge University Press, Cambridge, United Kingdon, 2004—673 Pages.
(Continued)

*Primary Examiner* — Negussie Worku (57) ABSTRACT

An electronic device configured to render a three hundred and sixty (360) degree image includes a communication unit and a processor. The communication unit is configured to receive a first image, a second image, and metadata from a camera. The processor is configured to render the 360 degree image by transforming the first image and the second image to compensate for a light fall-off, unwarping the transformed first image and second image, aligning the unwarped first image and second image, and blending the aligned unwarped first image and second image.

20 Claims, 9 Drawing Sheets

(51) Int. Cl.
*H04N 13/00* (2018.01)
*G06T 7/80* (2017.01)
*G11B 27/031* (2006.01)
*G11B 27/28* (2006.01)
*H04N 21/854* (2011.01)
*H04N 21/4223* (2011.01)
*H04N 13/02* (2006.01)
*H04N 13/189* (2018.01)
*H04N 13/239* (2018.01)
*H04N 13/271* (2018.01)
*G06F 3/0481* (2013.01)
*G06T 7/00* (2017.01)

(52) U.S. Cl.
CPC ..... *H04N 13/0011* (2013.01); *H04N 13/0055* (2013.01); *H04N 13/0239* (2013.01); *H04N 13/0271* (2013.01); *H04N 13/189* (2018.05); *H04N 13/239* (2018.05); *H04N 13/271* (2018.05); *H04N 21/4223* (2013.01); *H04N 21/854* (2013.01); *G06F 3/04815* (2013.01); *G06T 7/97* (2017.01)

(58) Field of Classification Search
CPC .......... H04N 13/271; H04N 21/854; G06F 3/04815; G11B 27/031; G11B 27/28
USPC ....... 382/167, 154, 164, 165, 168, 199, 283; 358/473, 479, 483, 513
See application file for complete search history.

(56) References Cited

U.S. PATENT DOCUMENTS

| | | | | |
|---|---|---|---|---|
| 8,368,773 | B1* | 2/2013 | Jin | G06K 9/3275 348/222.1 |
| 8,842,190 | B2* | 9/2014 | Chen | G06T 3/0062 348/222.1 |
| 2008/0259223 | A1* | 10/2008 | Read | H04N 9/3147 348/745 |
| 2010/0045773 | A1 | 2/2010 | Ritchey | |
| 2010/0073499 | A1* | 3/2010 | Gere | H04N 5/2254 348/222.1 |
| 2011/0050887 | A1* | 3/2011 | Nelson | H04N 9/31 348/135 |
| 2013/0077890 | A1 | 3/2013 | Chen et al. | |
| 2014/0347709 | A1* | 11/2014 | Stafford | H04N 1/19594 358/479 |
| 2016/0014335 | A1 | 1/2016 | Chuang et al. | |
| 2016/0018076 | A1* | 1/2016 | Santiago | F21S 4/10 362/310 |
| 2016/0028950 | A1 | 1/2016 | Perazzi et al. | |
| 2016/0088287 | A1 | 3/2016 | Sadi et al. | |
| 2016/0124202 | A1* | 5/2016 | Huang | G02B 21/0056 359/371 |

OTHER PUBLICATIONS

C. Geyer, T. Pajdla, K. Daniilidis, "Short Course on Omnidirectional Vision," The IEEE International Conference on Computer Vision, Oct. 2003.216 Pages.

D. Scaramuzza, A. Martinelli and R. Siegwart, "A Flexible Technique for Accurate Omnidirectional Camera Calibration and Structure from Motion," Proceedings of IEEE International Conference of Vision Systems (ICVS'06), New York, Jan. 5-7, 2006. 7 Pages.

D. Scaramuzza, A. Martinelli, and R. Siegwart, "A Toolbox for Easy Calibrating Omnidirectional Cameras," Proceedings to IEEE International Conference on Intelligent Robots and Systems (IROS 2006), Beijing China, Oct. 7-15, 2006. 7 Pages.

M. Brown, D.G. Lowe, "Automatic Panoramic Image Stitching using Invariant Features," International Journal of Computer Vision, vol. 74, pp. 59-73, 2007. 16 Pages.

R. Szeliski, Computer Vision: Algorithms and Applications; http://szeliski.org/book, Springer, London, 2011, -979 Pages.

J.P. Lewis, "Fast Template Matching," Vision Interface 95, Canadian Image Processing and Pattern Recognition Society, Quebec City, Canada, pp. 120-123, May 1995. 4 Pages.

F. Huang, et al. "Panoramic Imaging Sensor-Line Cameras and Laser Range-Finders", John Wiley & Sons, Ltd. Chichester, West Sussex United Kingdom, 2008—4 pages.

International Search Report and Written Opinion regarding International Application No. PCT/KR2017/009826, dated Dec. 11, 2017, 9 pages.

* cited by examiner

THREE HUNDRED SIXTY DEGREE VIDEO STITCHING

CROSS-REFERENCE TO RELATED APPLICATION AND CLAIM OF PRIORITY

This application claims priority under 35 U.S.C. § 119(e) to U.S. Provisional Patent Application No. 62/384,981 filed on Sep. 8, 2016 and U.S. Provisional Patent Application No. 62/411,806 filed on Oct. 24, 2016. The above-identified provisional patent applications are hereby incorporated by reference in its entirety.

TECHNICAL FIELD

This disclosure relates generally to image processing. More specifically, this disclosure relates to an apparatus and method for combining multiple images into a three hundred sixty degree image.

BACKGROUND

Three hundred sixty (360) degree imaging is a technique that captures all the viewing directions in an environment simultaneously and gives users the sense of immersion. The 360 degree image may be obtained using a catadioptric optical system, which combines a lens (dioptric) and a mirror (catoptric) to record 360-degree images or videos. The catadioptric optical system may record 360 degree videos in real time, but the captured field of view is typically less than 360×180 degrees.

For high resolution 360×180-degree immersive imaging, an alternative optical system. e.g., polydioptric is widely adopted. A polydioptric camera enables high-resolution panoramic arts by stacking multiple dioptric lenses with overlapping fields of view in one system. The photographs taken by these lenses undergo a stitching process that registers one picture to another, eliminates visible seams, and blends warped images to produce a final panorama. On the downside, such cameras are extremely expensive, even with the decreasing cost of image sensors, and are out of reach for most of the regular users. Low cost polydioptric cameras may also be used. However, such cameras have a narrow overlap thereby preventing the stitching process from forming the correct transformation (homography) matrix to align the images.

SUMMARY

This disclosure provides a method and apparatus for combining multiple images into a three hundred sixty degree image.

In a first embodiment, an electronic device that renders a three hundred and sixty (360) degree image includes a communication unit and a processor. The communication unit is configured to receive a first image, a second image, and metadata from a camera. The processor is configured to render the 360 degree image by transforming the first image and the second image to compensate for a light fall-off, unwarping the transformed first image and second image, aligning the unwarped first image and second image, and blending the aligned unwarped first image and second image.

In a second embodiment, a method for rendering a three hundred and sixty (360) degree image in an electronic device having a processor includes receiving a first image, a second image, and metadata from a camera. The method also includes transforming the first image and the second image to compensate for a light fall-off and unwarping the transformed first image and second image. The unwarped first image and second image are aligned and blended.

In a third embodiment, a non-transitory computer readable medium embodying a computer program, the computer program comprising computer readable program code that when executed causes at least one processing device to receive a first image, a second image, and metadata from a camera. The at least one processing device also transforms the first image and the second image to compensate for a light fall-off and unwarps the transformed first image and second image. The unwarped first image and second image are aligned and blended by the at least one processing device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

Figure 1:
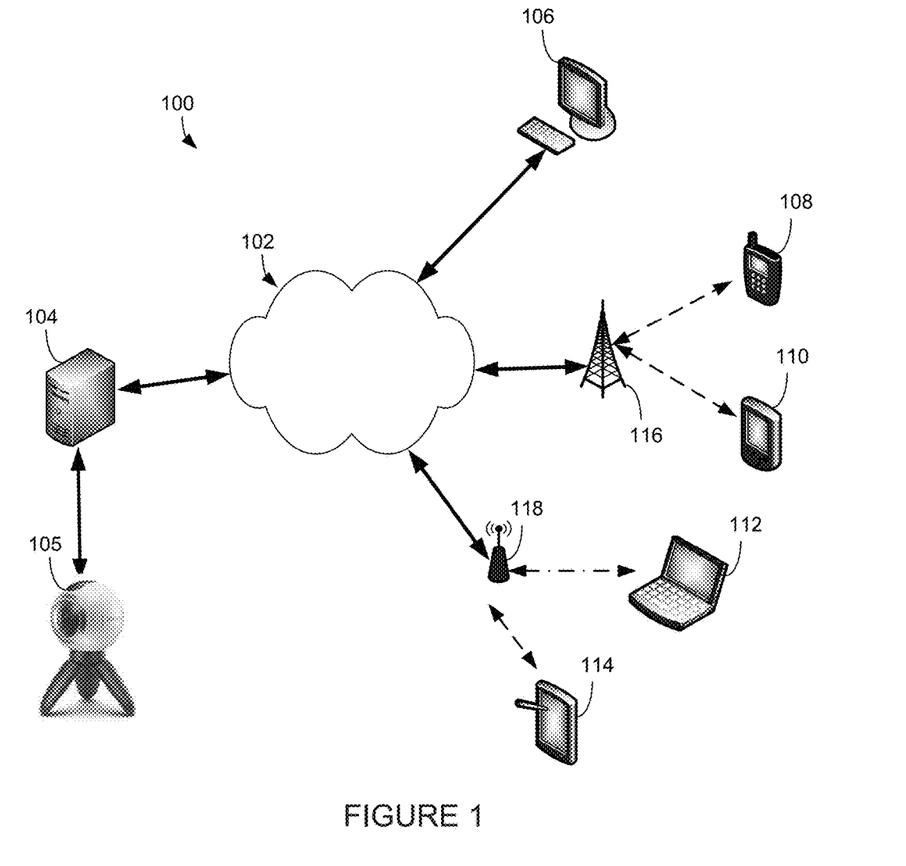
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. The server 104 includes any suitable computing or processing device that can provide computing services for one or more client devices. The server 104 could, for example, include one or more processing devices, one or more memories storing instructions and data, and one or more network interfaces facilitating communication over the network 102.

Camera 105 represents any suitable image capturing device capable of capturing a three hundred sixty (360) degree image of a surrounding environment. The camera 105 may have a pair of lenses, a front facing lens or a rear facing lens. In some embodiments, the any number of lenses may be used as long as the lenses are capable of capturing the 360 degree image.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, the client devices 106-114 to render and/or display 360 degree images and/or video.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
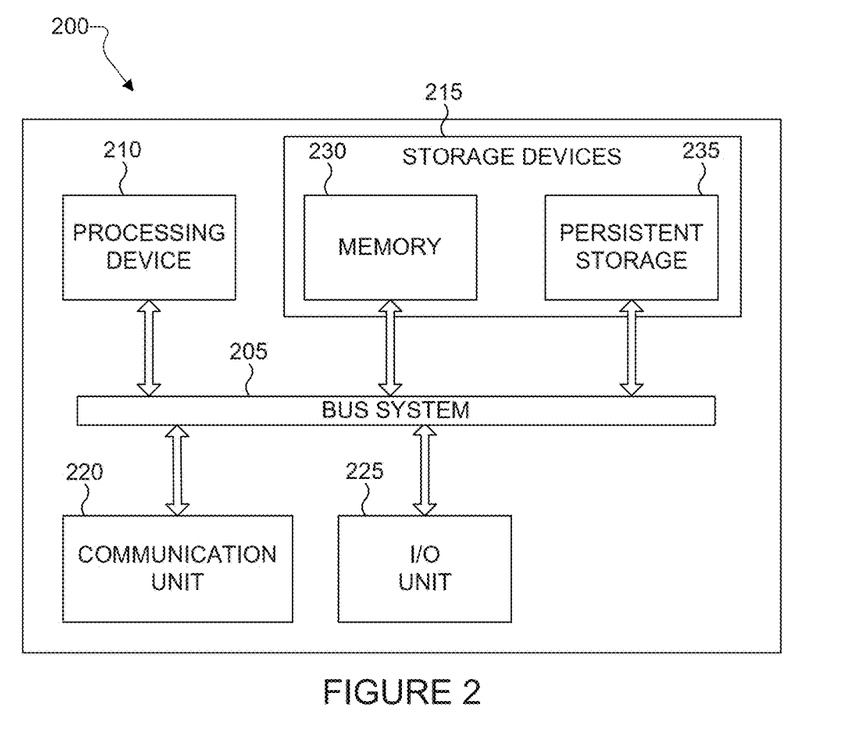
FIGS. 2 and 3 illustrate example devices in a computing system according to this disclosure.
Figure 3:
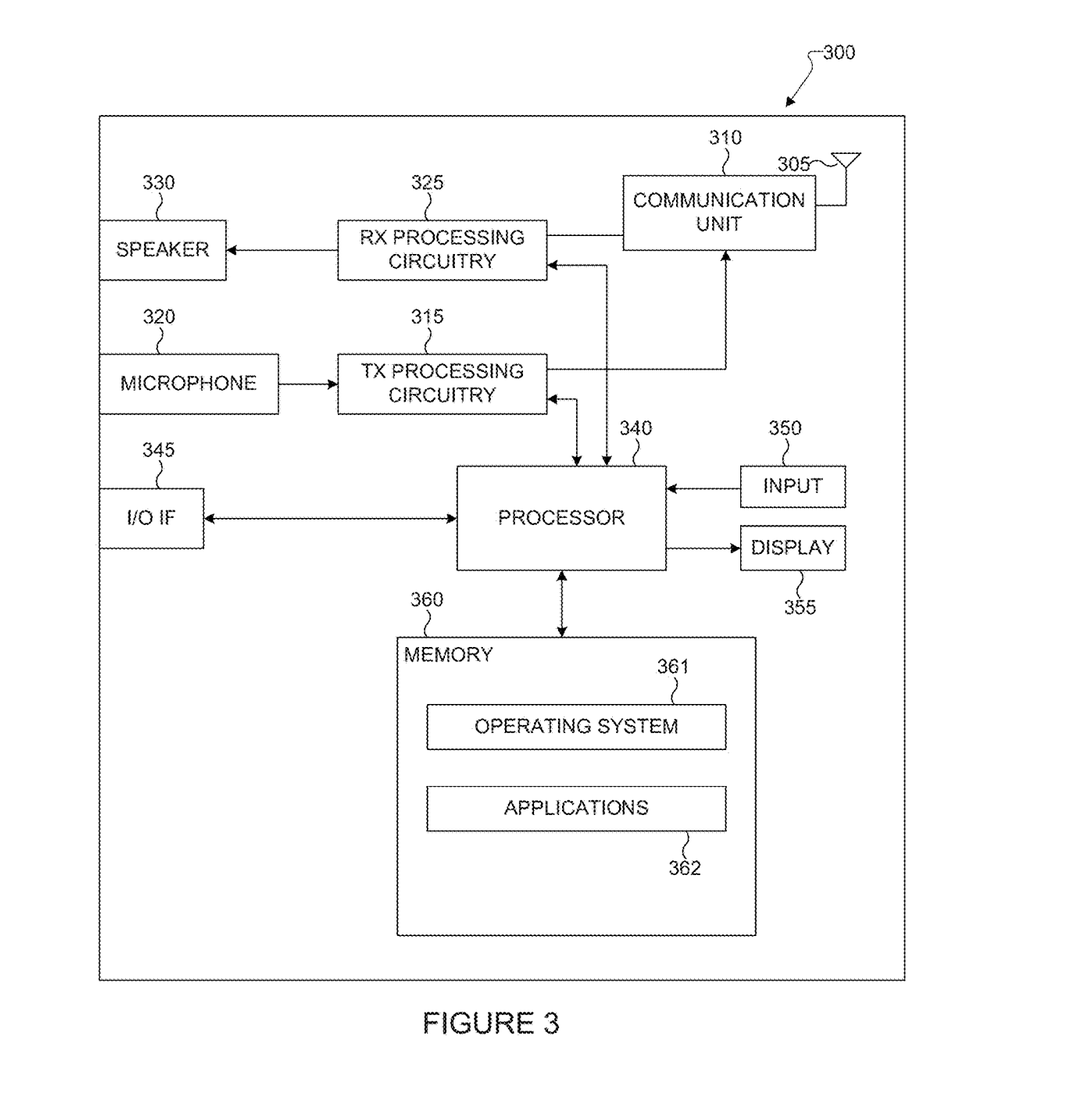

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

In the embodiments described herein, server 104 may render 360 degree images and/or video based on a number of images received from camera 105. In some embodiments, the server may receive images from the camera 105 along with metadata and provides the images and metadata to one of the client devices 106-114.

As shown in FIG. 3, the client device 300 includes an antenna 305, a communication unit 310, transmit (TX) processing circuitry 315, a microphone 320, and receive (RX) processing circuitry 325. The client device 300 also includes a speaker 330, a processor 340, an input/output (I/O) interface (IF) 345, an input 350, a display 355, and a memory 360. The memory 360 includes an operating system (OS) program 361 and one or more applications 362.

The communication unit 310 receives, from the antenna 305, an incoming RF signal transmitted by another component in a system. The communication unit 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The communication unit 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the client device 300. For example, the processor 340 could control the reception of forward channel signals and the transmission of reverse channel signals by the communication unit 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from external devices or an operator. The processor 340 is also coupled to the I/O interface 345, which provides the client device 300 with the ability to connect to other devices such as laptop computers and handheld computers. The I/O interface 345 is the communication path between these accessories and the processor 340.

The processor 340 is also coupled to the input 350 and the display unit 355. The operator of the client device 300 can use the input 350 to enter data into the client device 300. For example, the input 350 may be a touchscreen, button, and/or keypad. The display 355 may be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the client device 300 may receive a number of images in order to render a 360 degree image.

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
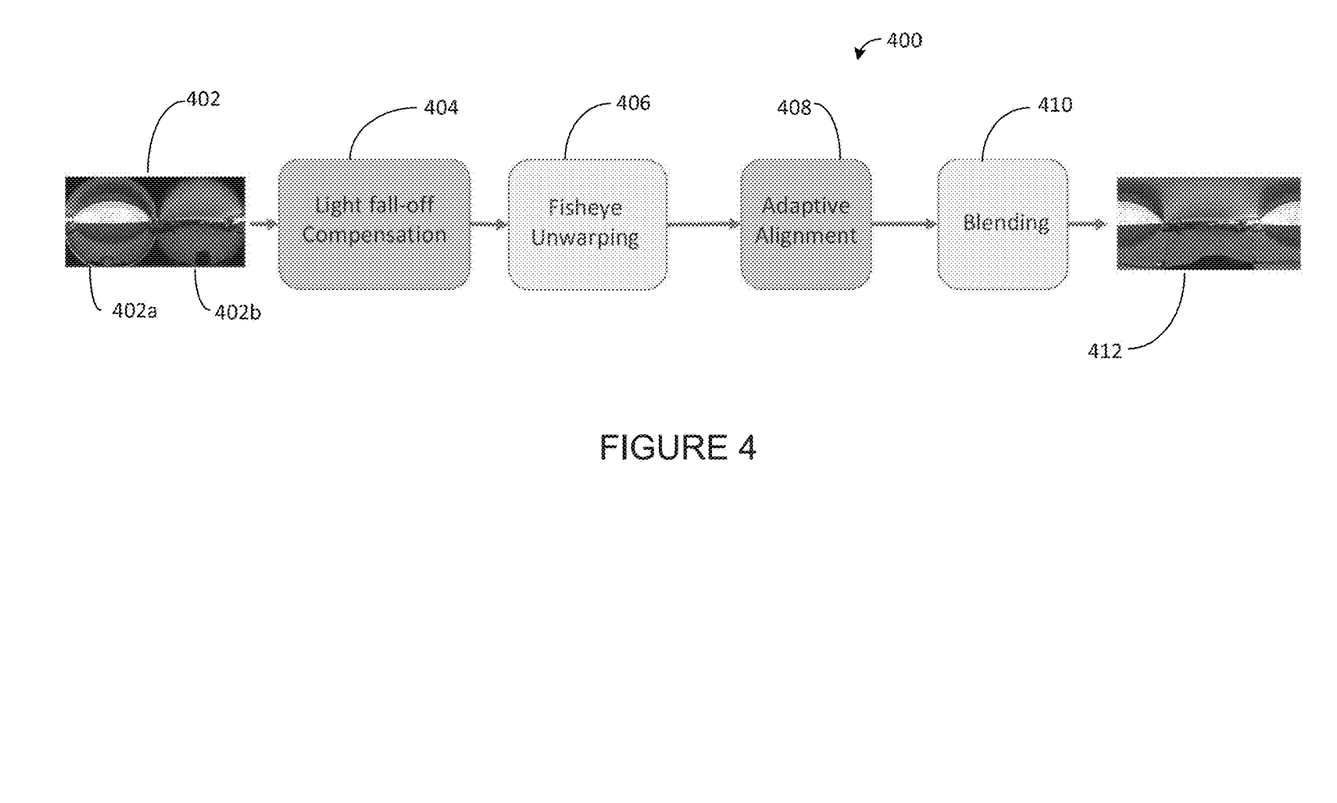
FIG. 4 illustrates an example method for stitching images according to this disclosure.

FIG. 4 illustrates a method 400 for stitching images 402 received from an image capture device such as camera 105. The method 400 may be performed in server 104 or in any one of the client devices 106-114. Images 402 may include two images, a left image 402a and a right image 402b.

Figure 5A:
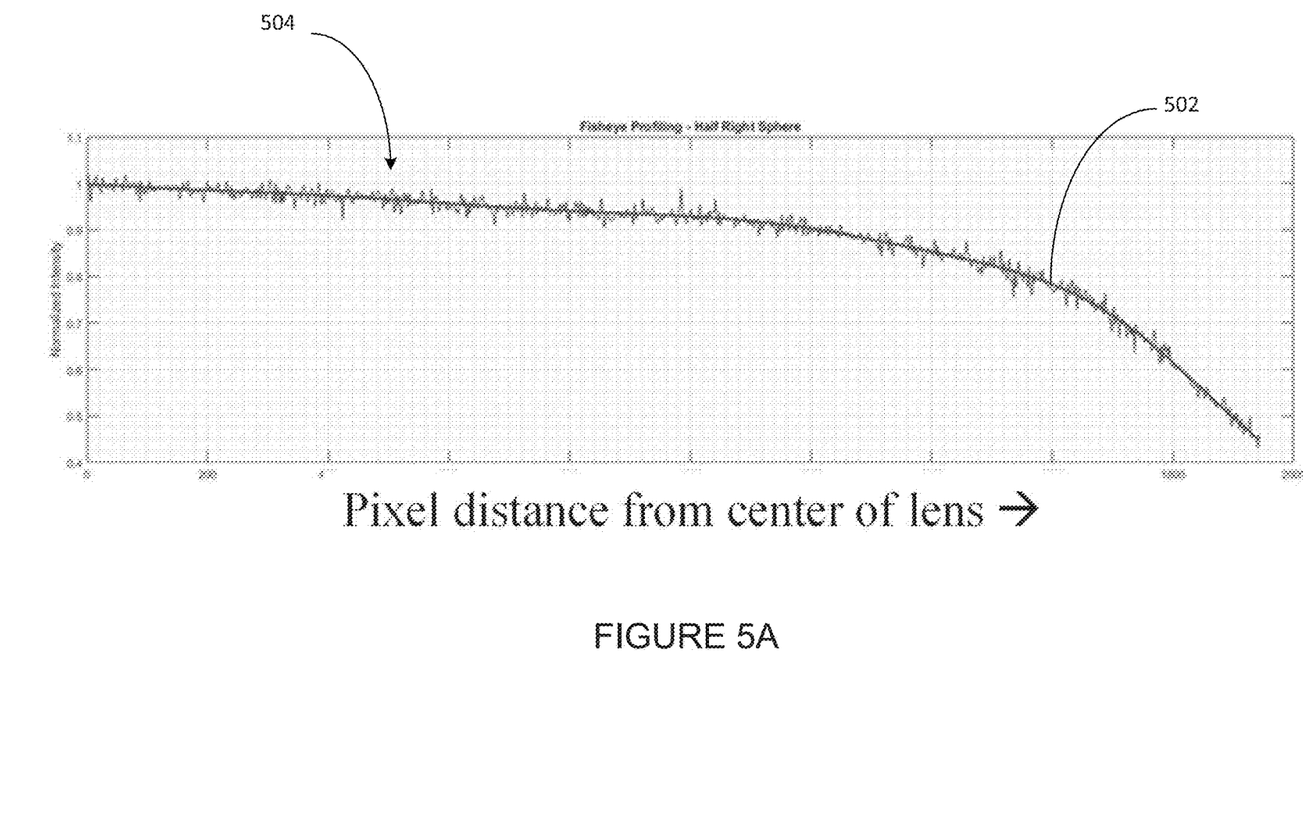
FIG. 5A illustrates a light-fall off curve according to this disclosure.

As shown in FIG. 4, a light fall-off compensation 404 is applied to the images 402. Light entering lenses on camera 105 suffers from a loss of intensity moving away from the center. In order to properly render the image, the light fall-off should be compensated. However, when calibrating the lens of a camera, thousands of samples need to be recorded to compensate for the light fall-off. In an embodiment of the disclosure, a polynomial equation (represented by line 502) is estimated for the thousands of light samples 504 as shown in FIG. 5A. The polynomial equation is transmitted to the rendering device (i.e., server 104 or client devices 106-114) from camera 105 as metadata. The rendering device uses the inverse of the polynomial equation to compensate for the light fall-off. By using the polynomial equation, the amount of data transmitted to the rendering device is drastically reduced thereby reducing the time and processing power needed to render the images. In one embodiment, the polynomial approximation of the light fall off curve can be represented as $p(x)=p_1 x^n + p_2 x^{n-1} + \ldots + p_n x + P_{n+1}$ where x is the radius from the center of the image.

In one embodiment, the metadata corresponding to the light fall-off curve (also called as lens shading curve) may include, e.g., the syntax and semantics shown in Table 1 which allows for transmission of different light fall-off curves for different color components:

TABLE 1

| | |
|---|---|
| Syntax | unsigned int(16) num_polynomial_coefficeients_lsc;<br>for(j=0; j< num_polynomial_coefficients_lsc; j++) {<br>    unsigned int(32) polynomial_coefficient_K_lsc_R;<br>    unsigned int(32) polynomial_coefficient_K_lsc_G;<br>    unsigned int(32) polynomial_coefficient_K_lsc_B;<br>} |
| Semantics | num_polynomial_coefficeients_lsc shall be the order of the polynomial approximation of the lens shading curve.<br>polynomial_coefficient_K_lsc_R shall be the coefficients of the polynomial approximation of the lens shading curve for red color component in 16.16 fixed point format.<br>polynomial_coefficient_K_lsc_G shall be the coefficients of the polynomial approximation of the lens shading curve for green color component in 16.16 fixed point format.<br>polynomial_coefficient_K_lsc_B shall be the coefficients of the polynomial approximation of the lens shading curve for blue color component in 16.16 fixed point format. |

Figure 5B:
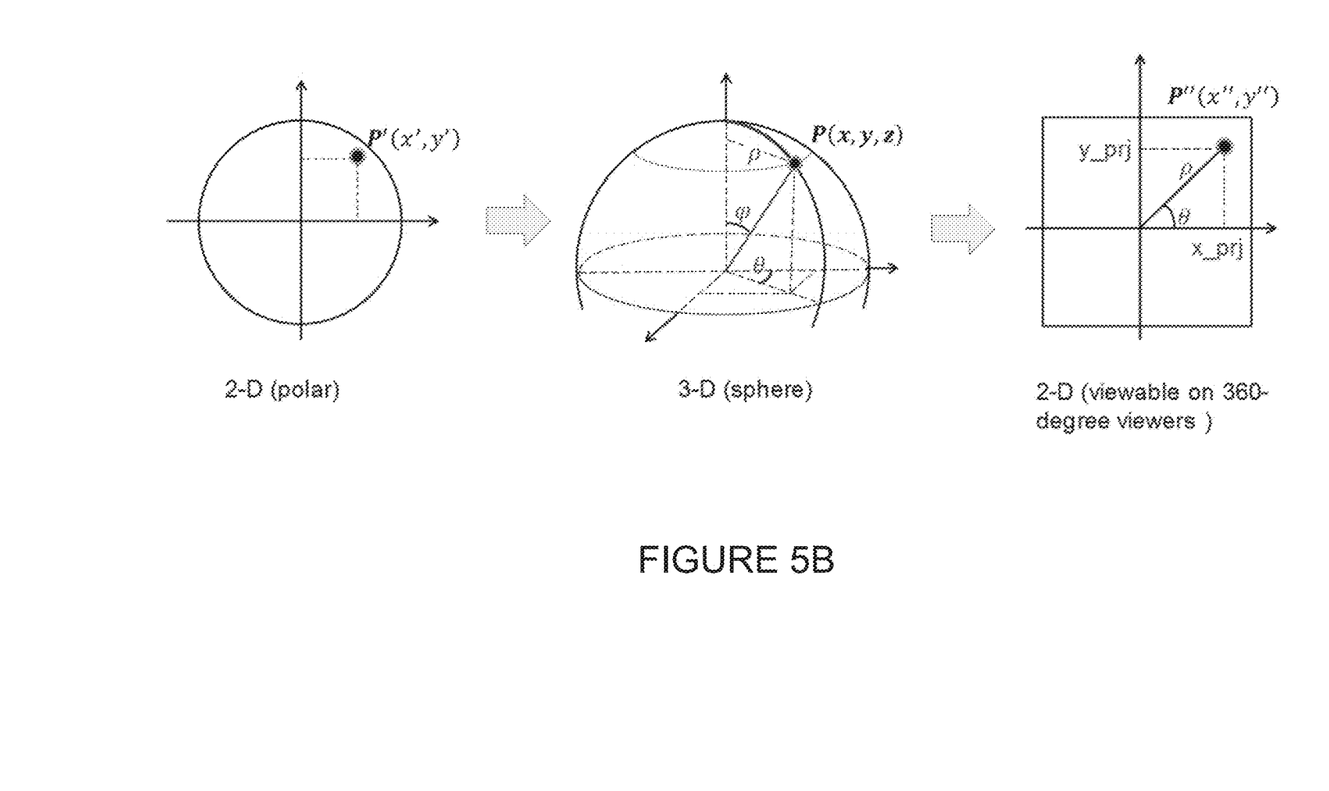
FIG. 5B illustrates a process for unwarping an image according to this disclosure.

After compensating for the light fall-off, an operation for unwarping the images 402 is performed in operation 406. Unwarping is a process in which a geometric distorted image is transformed into an image under another geometric arrangement. The transformation is comprised of three main steps as shown in FIG. 5B. First, the coordinates of the left image 402a and right image 402b are converted from a 2-D polar coordinate system into 3-D spherical domain. For example, a point P's coordinate in the 2-D image is converted into a 3-D point by its pitch and roll ($z_p$ and $x_p$ in a polar coordinate system. Second, in the 3-D spherical domain, the equi-distant $\rho$ and $\theta$ are derived for point P. Finally, the coordinate of the point P in the 3-D spherical domain is converted into a projected 2-D spherical plane using equations 1 and 2:

$$x_{prj} = \rho * \cos(\theta) \quad \text{Equation 1}$$

$$y_{prj} = \rho * \sin(\theta) \quad \text{Equation 2}$$

After the left image 402a and the right image 402b are unwarped, an adaptive alignment operation 408 is performed. The adaptive alignment operation involves a two-step alignment method to align the unwarped images. The first step involves compensating for a mechanical misalignment by deriving an affine matrix using fine-scale structures (e.g., checkerboards). One of the unwarped images is warped to another unwarped using the derived affine matrix. In the second step, a more refined alignment is performed on top of the first alignment. The alignment performed in the second step is based on an object and/or scene in the images.

In order to perform the first step, the rendering device receives metadata from the camera 105 including the affine matrix. The affine matrix transforms a point A($x_2$, y2) to B($x_1$, $y_1$) as defined as Equation 3:

$$[x_1 \; y_1 \; 1] = [x_2 \; y_2 \; 1] \begin{bmatrix} a & b & 0 \\ c & d & 0 \\ t_x & t_y & 1 \end{bmatrix} \quad \text{Equation 3}$$

In the second step, instead of minimizing the discontinuity in the overlapping regions, the similarity in the overlapping areas are maximized. The second step involves a fast template matching for objects in the overlapping regions that is a normalized cross-correlation operation. Because there is a certain degree of exposure differences in the overlapping regions, the template and reference images to be matched should be normalized. A fast normalized cross-correlation algorithm is defined as shown in Equation 4:

$$\gamma(u,v) = \frac{\sum_{x,y}[f(x,y) - \overline{f_{u,v}}][t(x-u, y-v) - \overline{t}]}{\left\{\sum_{x,y}[f(x,y) - \overline{f_{u,v}}]^2 \sum_{x,y}[t(x-u, y-v) - \overline{t}]^2\right\}^{0.5}} \quad \text{Equation 4}$$

where $\gamma$ is the normalized cross-correlation, f is the reference image, $\overline{t}$ is mean of the template image, $\overline{f_{u,v}}$ is the mean of f(x, y) in the region under the template.

Figure 5C:
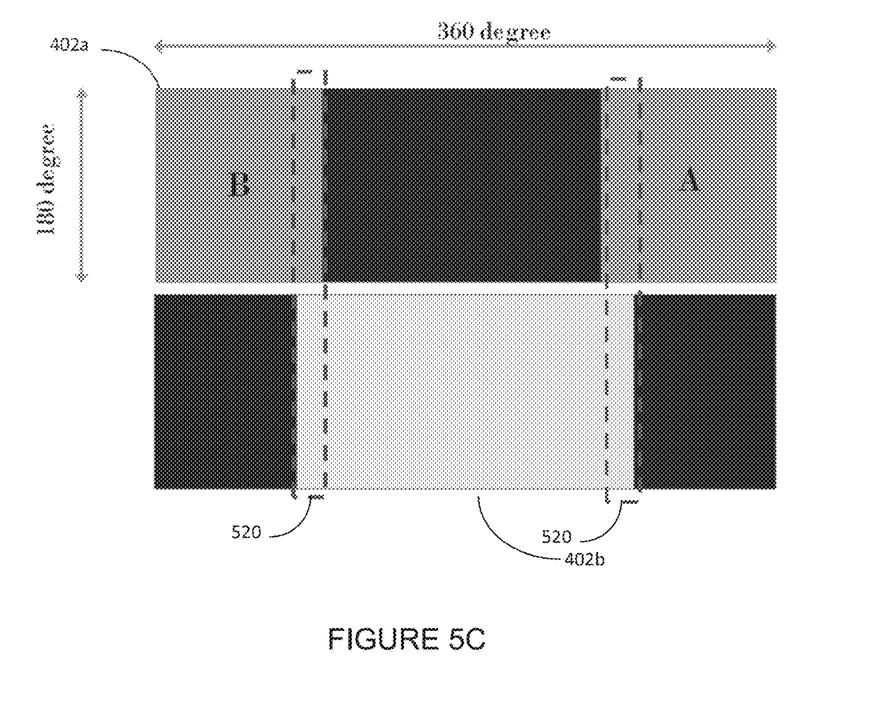
FIG. 5C illustrates the overlapping regions between two images in accordance with this disclosure.

In the second step, a template window and reference 520 to be matched is specified in the unwarped left image 402a and right image 402b as shown in FIG. 5C. After specifying the template window and a reference, template matching is performed using the normalized cross-correlation of Equation 4. The template matching returns a correlation matrix whose maximum value indicates the displacement of where the best match occurs. This match displacement indicates how much the template (i.e., a rectangular window) has to move to match the reference. The displacement is used to calculate a new position for the template. Based on the original template position and the new template position, four matching pairs are formed from the vertices of the original and new templates. An affine matrix is estimated from eight matching pairs (four in each overlapping region). Because there are just eight pairs, the affine estimation is done in real time, thus adaptive to scenes. One of the images is then warped using the new affine matrix.

In operation 410, the left image 402a and right image 402b are blended together. The blended pixel b(r, c) at row r and column c in the overlapping region of size r×n is computed using Equation 5 as follows:

$$b(r,c) = alpha1*leftImage(r,c) + alpha2*rightImage(r,c), \quad \text{Equation 5}$$

where leftImage(r,c) and rightImage(r,c) are the pixels at position (r,c) taken from the left image 402a and the right image 402b respectively. In one embodiment, in a case of blending the right overlapping region, alpha1=c/n, where n is the width of the blending region. In case of blending the left overlapping region, alpha1=(n−c+1)/n. In another embodiment, in case of blending the right overlapping region, alpha2=(n−c+1)/n. In case of blending the left overlapping region, alpha2=c/n.

After the left image 402a and the right image 402b are blended, the 360 degree image 412 is rendered.

Figure 6A:
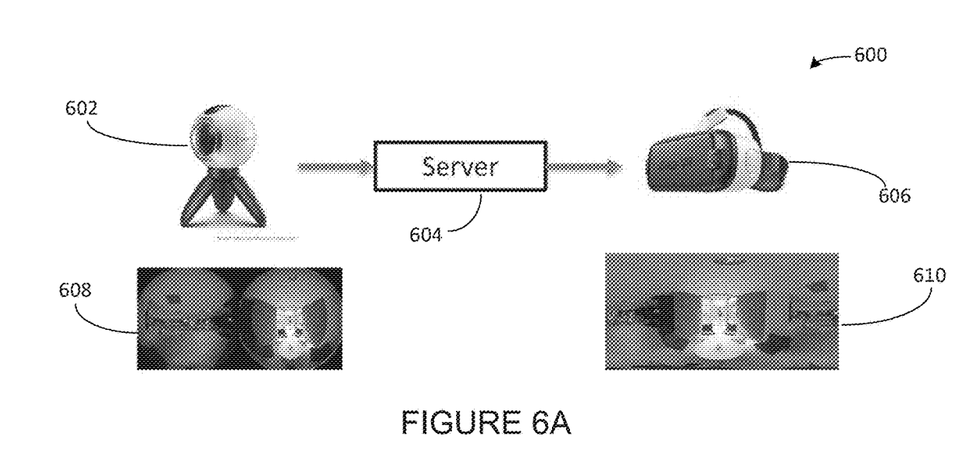
FIGS. 6A and 6B illustrate example systems for stitching images according to this disclosure.

FIGS. 6A and 6B illustrate example systems 600 and 620 according to this disclosure. As shown in FIG. 6A, system 600 includes a camera 602, which could represent camera 105 of FIG. 1, that transmits images 608 to a server 604. Server 604 could represent the server 104 in FIG. 1. Server 604 processes the images 608 based on metadata received from the camera 602 to render a 360 degree image 610. The metadata may include a polynomial equation that represents the light fall-off and an affine matrix that represents the misalignment in the lenses of camera 602. After rendering the 360 degree image 610, the server 604 transmits the 360 degree image 610 to the client device 606.

Figure 6B:
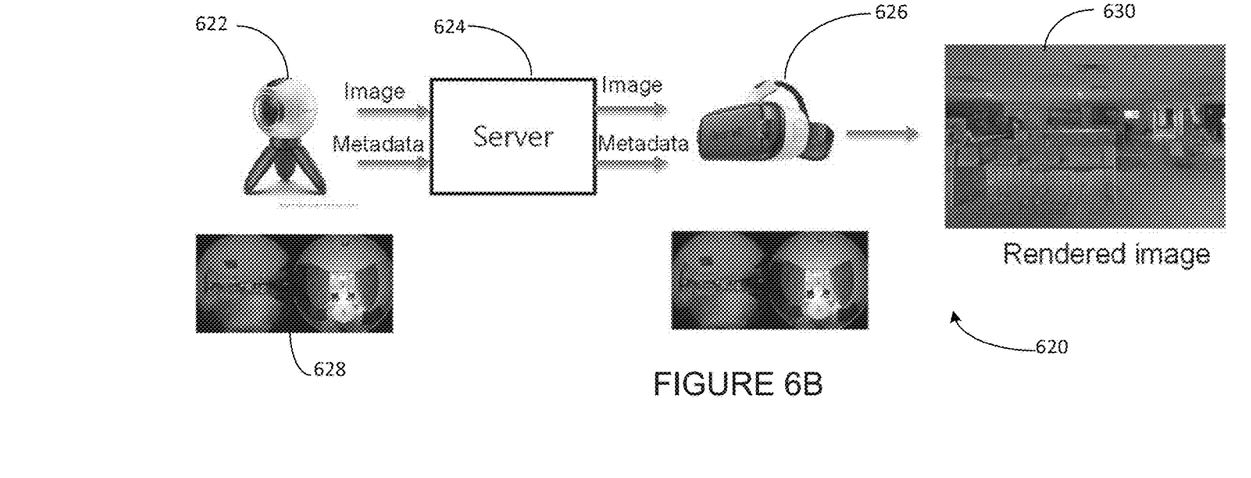

In another embodiment, as shown in FIG. 6B, the system 620 includes a camera 622 that transmits the images 628 and the corresponding metadata to a server 624. The server 624 then transmits images 628 and the metadata to the client device 626. The client device 626 then renders the image to generate 360 degree image 630. By transmitting images 628 and the metadata to the client device 626, the end-to-end delay is reduced and video quality is improved by reducing the number of resamplings.

Figure 7:
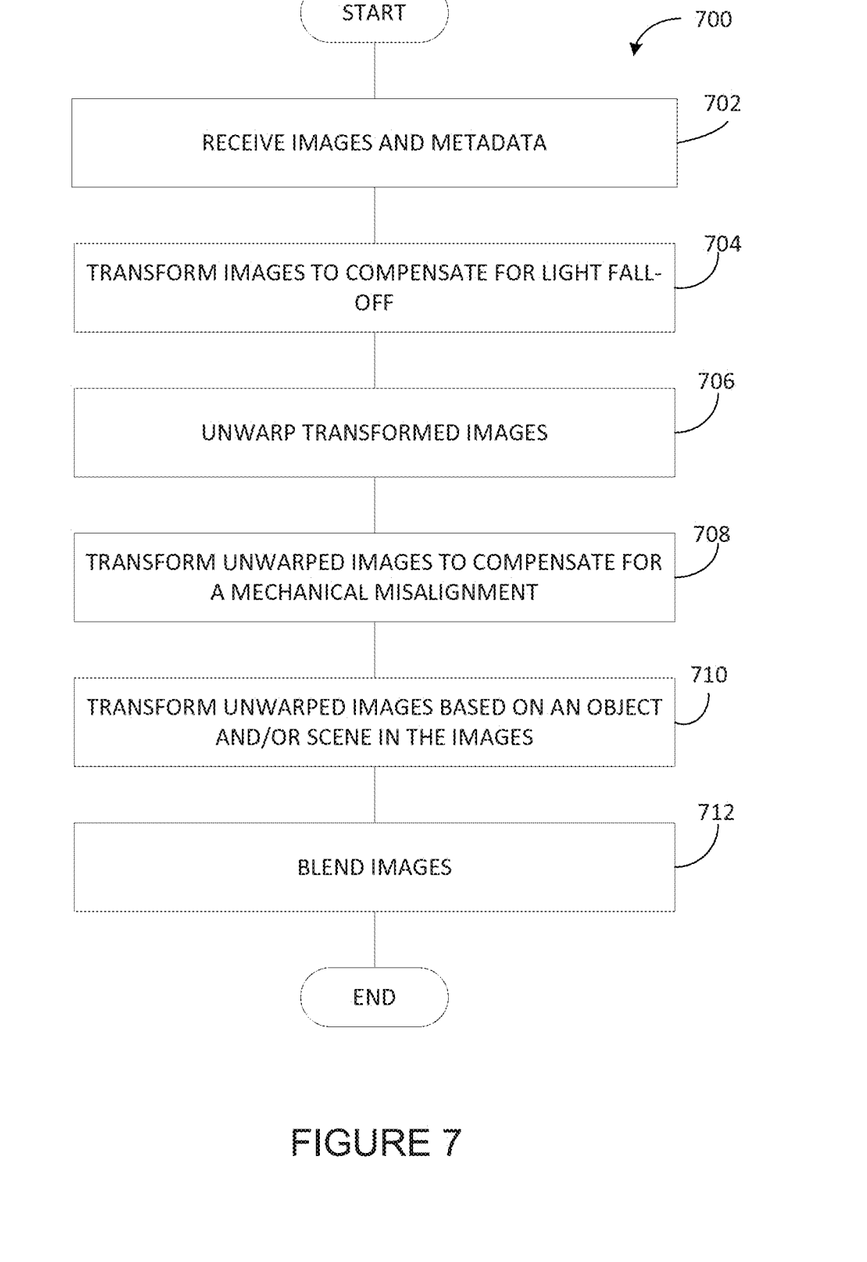
FIG. 7 illustrates a flowchart of a method for stitching images according to this disclosure.

FIG. 7 illustrates a method 700 for stitching images according to an embodiment of the present disclosure. The method 700 may be performed in either server 200 or client device 300. For ease of explanation, the method 700 will be described with reference to the client device 300.

In method 700, the communication unit 310 receives at least two images, a left image and a right image, and metadata from a camera in operation 702. In operation 704, the processor 340 transforms the images to compensate for the light-fall-off based on the metadata. In some embodiments, the metadata may include a polynomial equation that represent the light fall-off. In other embodiments, the metadata may transmit a unique identifier that represents a polynomial equation stored in memory 360 of client device 300. The unique identifier would be used to obtain the polynomial equation from memory 360 by processor 340.

In operation 706, the transformed images are unwarped by processor 340. As described above, unwarping the images involves converting the coordinates of the left image and right image from a 2-D polar coordinate system into 3-D spherical domain. In the 3-D spherical domain, the equidistant ρ and Θ are derived. Finally, the coordinate of the point P in the 3-D spherical domain is converted into a projected 2-D spherical plane In operation 708, the unwarped left and right images are transformed to correct for any mechanical misalignment in the lenses of the camera. In order to transform the images, the processor 340 applies an affine matrix to the left and right images. In some embodiments, the affine matrix is included in the metadata from the camera. In other embodiments, the metadata may include a unique identifier for the camera that corresponds to affine matrix stored in memory 360 of client device 300.

After transforming the images to correct for a mechanical misalignment, the unwarped images are transformed based on an object or scene in the images in operation 710. In operation 710, the processor 340 finds the best match at the left and right boundaries of the unwarped left and right images. The processor 340 then creates eight (8) pairs of correspondent matching points and solves for an affine transform matrix. The left and right images are then warped accordingly using the affine transform matrix.

In operation 712, the left and right images are blended together to create a 360 degree image. Specifically, the processor 340 blends a pixel in an overlapping region in the left image with a corresponding pixel in the overlapping region in the right image. The process is repeated for each pixel in the overlapping region.

In the embodiments described above, the stitching is performed based on an object or scene in the images. In other embodiments, the stitching artifacts may be most noticeable when a person is in the stitching boundary. When a person is in the boundary, skin tone detection may be used to adaptively change the stitching boundary. In other embodiments, the light fall-off compensation may lead to color artifacts. In order to avoid the color artifacts, the processor 340 may perform a region based local light fall-off compensation e.g. by modifying the light fall-off compensation curve at the boundary in a contiguous region such as the sky so that the color is continuous around the boundary. In other embodiments, the geometric alignment may be improved by using stereo from the overlapping region. The processor 340 calculates the disparity from images that overlap between the two lenses and calculates depth information. The depth parameters are used to determine parameters to use for geometric alignment.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device configured to render a three hundred and sixty (360) degree image, the electronic device comprising:
    a communication unit configured to receive a first image, a second image, and metadata from a camera; and
    a processor configured to render the 360 degree image by:
        transforming the first image and the second image to compensate for a light fall-off;
        unwarping the transformed first image and second image;
        aligning the unwarped first image and second image; and
        blending an overlapping portion of the aligned unwarped first image and second image to render the 360 degree image.

2. The electronic device of claim 1, wherein the communication unit is configured to transmit the rendered 360 degree image to a user equipment (UE).

3. The electronic device of claim 1, wherein transforming the first image and the second image to compensate for a light fall-off is based on a polynomial equation included in the metadata.

4. The electronic device of claim 1, wherein aligning the unwarped first image and second image comprises:
    transforming the unwarped first image and second image to compensate for a mechanical misalignment of the camera; and
    transforming the unwarped first image and second image based on at least one of an object or a scene in the unwarped first image and second image.

5. The electronic device of claim 4, wherein transforming the unwarped first image and second image to compensate for a mechanical misalignment is based on an affine matrix included in the metadata.

6. The electronic device of claim 4, wherein transforming the unwarped first image and second image based on at least one of an object or a scene in the unwarped first image and second image comprises:
    determining a first template and a reference to match in at least one boundary shared between the unwarped first image and second image;
    matching the first template to return a correlation matrix;
    determining a displacement between the first template and the reference;
    determining a second template based on the displacement;

determining an affine matrix based on the first template and the second template; and warping at least one of the first image or the second image based on the affine matrix.

7. The electronic device of claim 6, wherein matching the first template is based on a normalized cross-correlation.

8. The electronic device of claim 6, wherein the affine matrix is determined based on a plurality of vertices in the first template and the second template.

9. A method for rendering a three hundred and sixty (360) degree image in an electronic device having a processor, the method comprising:

receiving a first image, a second image, and metadata from a camera;

transforming, by the processor, the first image and the second image to compensate for a light fall-off;

unwarping, by the processor, the transformed first image and second image;

aligning, by the processor, the unwarped first image and second image; and blending, by the processor, an overlapping portion of the aligned unwarped first image and second image to render the 360 degree image.

10. The method of claim 9, further comprising transmitting the rendered 360 degree image to a user equipment (UE).

11. The method of claim 9, wherein transforming the first image and the second image to compensate for a light fall-off is based on a polynomial equation included in the metadata.

12. The method of claim 9, wherein aligning the unwarped first image and second image comprises:

transforming the unwarped first image and second image to compensate for a mechanical misalignment of the camera; and transforming the unwarped first image and second image based on at least one of an object or a scene in the unwarped first image and second image.

13. The method of claim 12, wherein transforming the unwarped first image and second image to compensate for a mechanical misalignment is based on an affine matrix included in the metadata.

14. The method of claim 12, wherein transforming the unwarped first image and second image based on at least one of an object or a scene in the unwarped first image and second image comprises:

determining a first template and a reference to match in at least one boundary shared between the unwarped first image and second image;

matching the first template to return a correlation matrix;

determining a displacement between the first template and the reference;

determining a second template based on the displacement;

determining an affine matrix based on the first template and the second template; and warping at least one of the first image or the second image based on the affine matrix.

15. The method of claim 14, wherein matching the template is based on a normalized cross-correlation.

16. The method of claim 14, wherein the affine matrix is determined based on a plurality of vertices in the first template and the second template.

17. A non-transitory computer readable medium embodying a computer program, the computer program comprising computer readable program code that when executed causes at least one processing device to:

receive a first image, a second image, and metadata from a camera; and transform the first image and the second image to compensate for a light fall-off;

unwarp the transformed first image and second image;

align the unwarped first image and second image; and blend an overlapping portion of the aligned unwarped first image and second image to render a 360 degree image.

18. The non-transitory computer readable medium of claim 17, wherein the at least one processing device transforms the first image and the second image to compensate for a light fall-off based on a polynomial equation included in the metadata.

19. The non-transitory computer readable medium of claim 17, wherein the at least one processing device aligns the unwarped first image and second image by:

transforming the unwarped first image and second image to compensate for a mechanical misalignment of the camera; and transforming the unwarped first image and second image based on at least one of an object or a scene in the unwarped first image and second image.

20. The non-transitory computer readable medium of claim 19, wherein the at least one processing device transforms the unwarped first image and second image based on at least one of an object or a scene in the unwarped first image and second image by:

determining a first template and a reference to match in at least one boundary shared between the unwarped first image and second image;

matching the first template to return a correlation matrix;

determining a displacement between the first template and the reference;

determining a second template based on the displacement;

determining an affine matrix based on the first template and the second template; and warping at least one of the first image or the second image based on the affine matrix.

* * * * *